No. 741,002. PATENTED OCT. 6, 1903.
E. GROSSE.
MACHINE FOR CUTTING THE EDGES OF BOOKS.
APPLICATION FILED JULY 16, 1900.

NO MODEL. 6 SHEETS—SHEET 1.

Witnesses: Inventor:
Edward Grosse
By Knight Bros
Attorneys

No. 741,002. PATENTED OCT. 6, 1903.
E. GROSSE.
MACHINE FOR CUTTING THE EDGES OF BOOKS.
APPLICATION FILED JULY 16, 1900.
NO MODEL. 6 SHEETS—SHEET 2.

Witnesses:
Inventor:
Edward Grosse
By Knight Bros
Attorneys

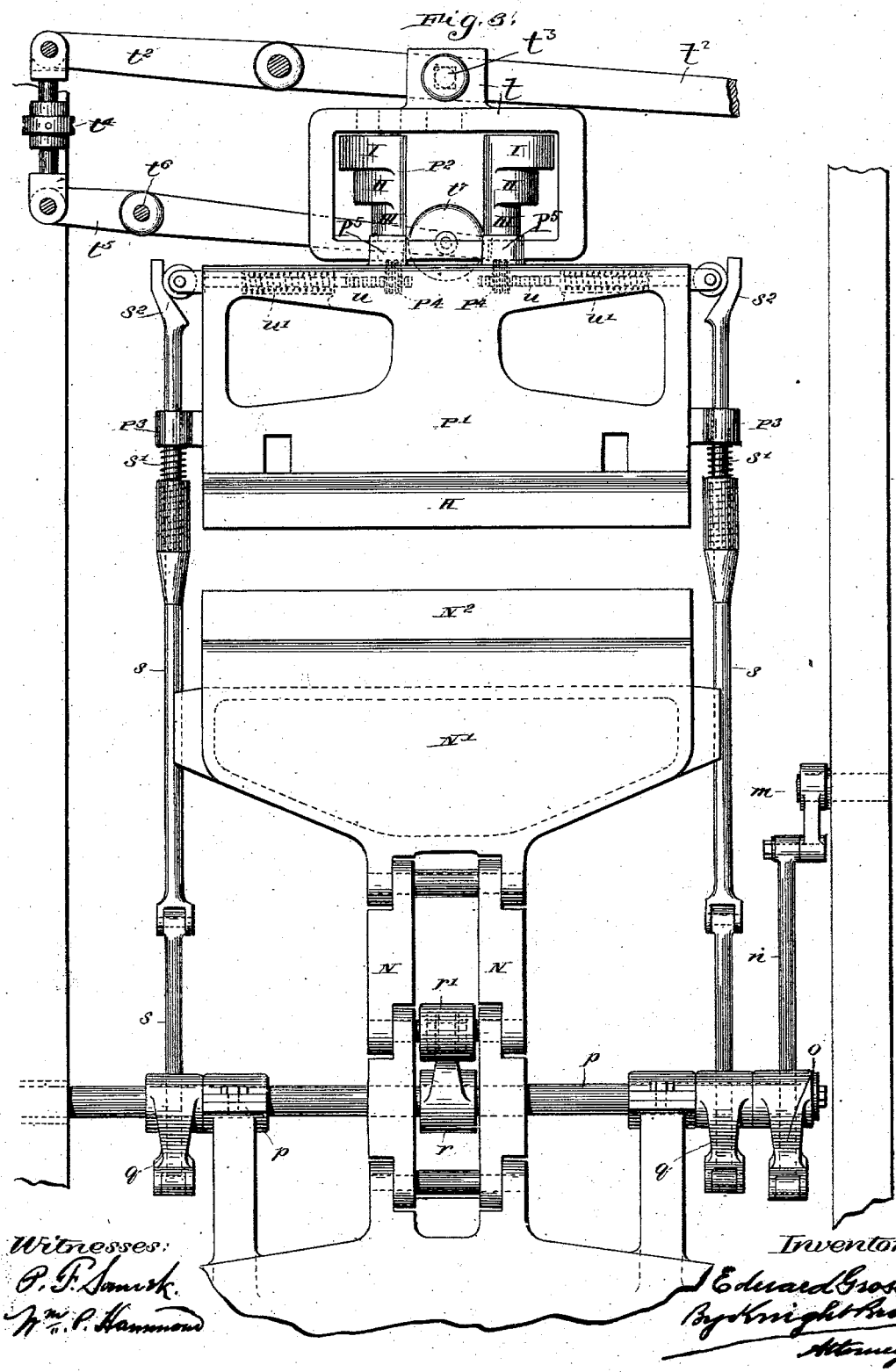

No. 741,002. PATENTED OCT. 6, 1903.
E. GROSSE.
MACHINE FOR CUTTING THE EDGES OF BOOKS.
APPLICATION FILED JULY 16, 1900.
NO MODEL. 6 SHEETS—SHEET 4.
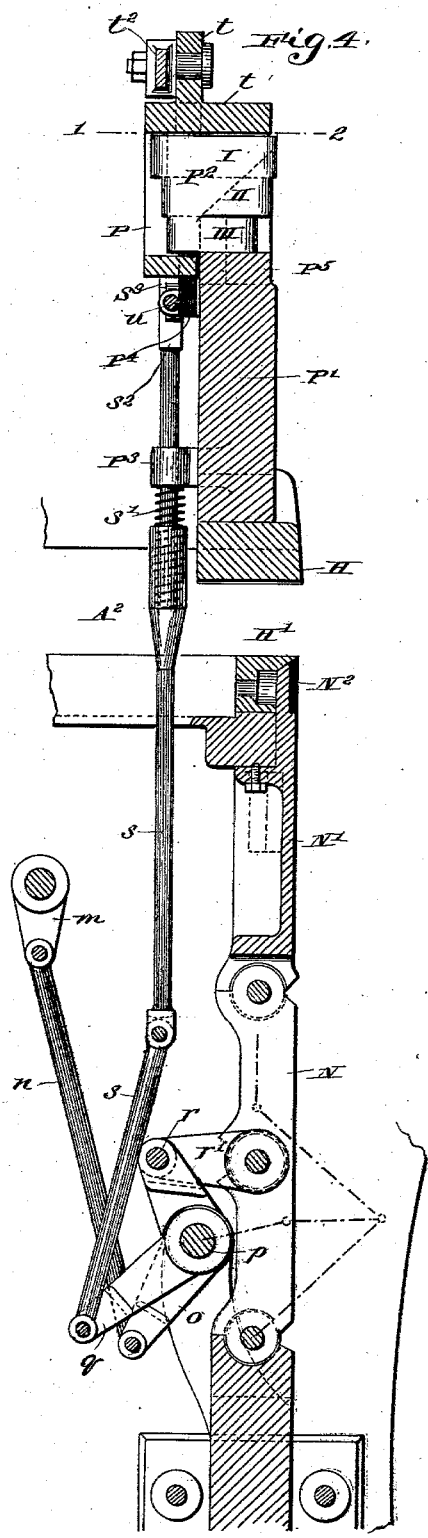

No. 741,002. PATENTED OCT. 6, 1903.
E. GROSSE.
MACHINE FOR CUTTING THE EDGES OF BOOKS.
APPLICATION FILED JULY 16, 1900.
NO MODEL. 6 SHEETS—SHEET 5.
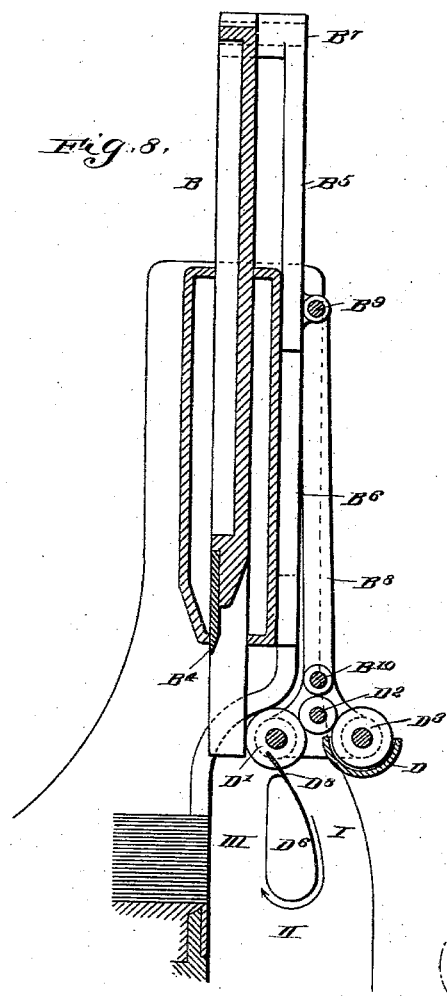
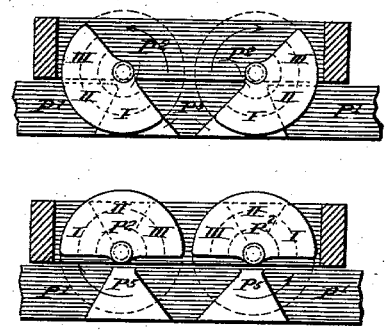
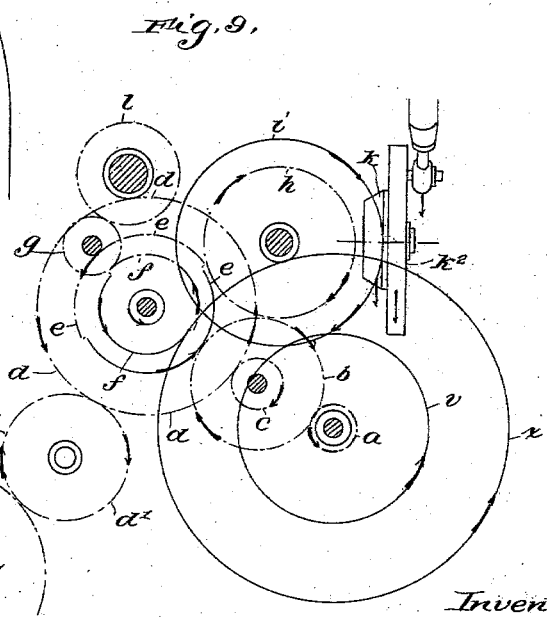
Witnesses:
Inventor:
Edward Grosse No. 741,002. PATENTED OCT. 6, 1903.
E. GROSSE.
MACHINE FOR CUTTING THE EDGES OF BOOKS.
APPLICATION FILED JULY 16, 1900.
NO MODEL. 6 SHEETS—SHEET 6.
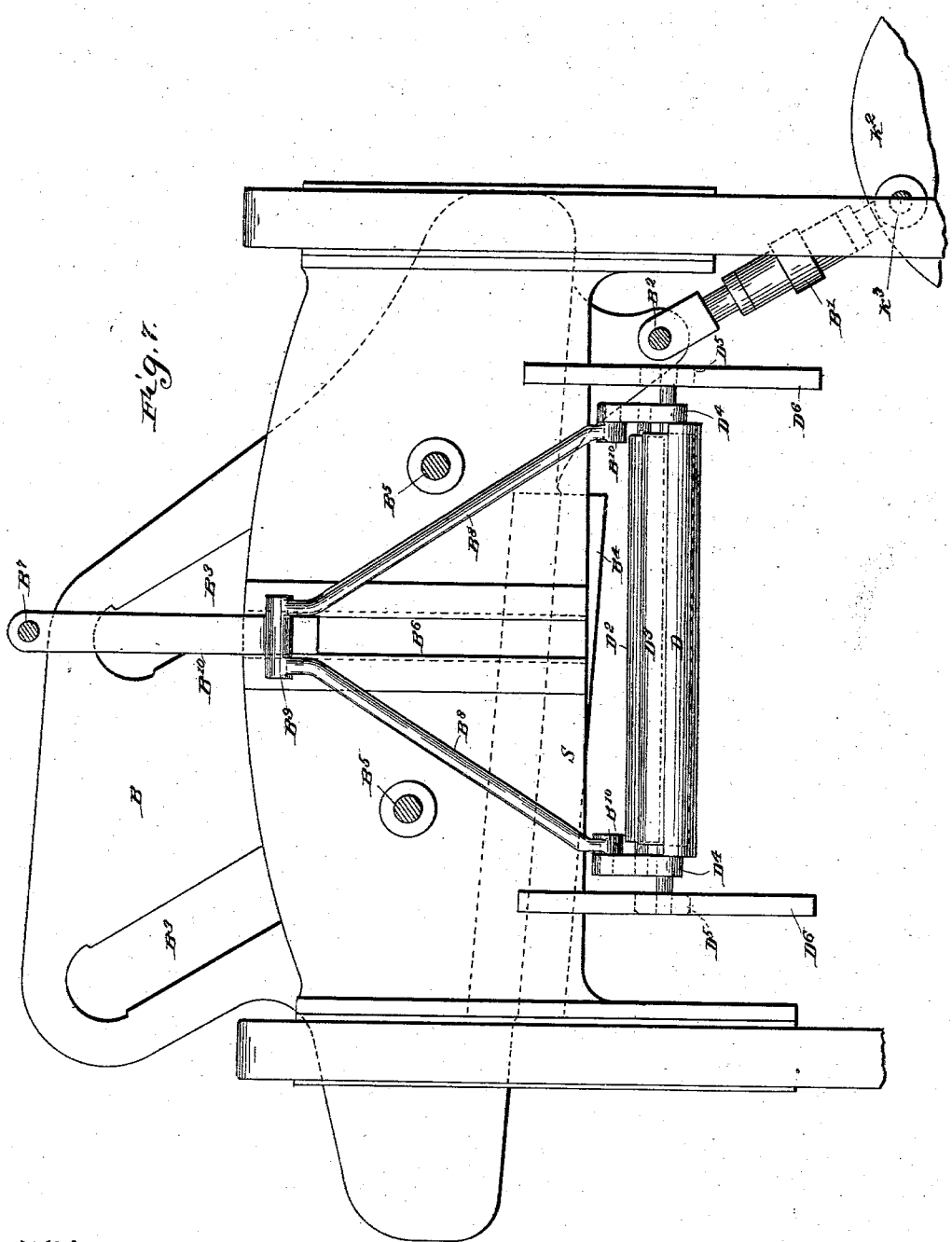

No. 741,002. Patented October 6, 1903.

UNITED STATES PATENT OFFICE.

EDUARD GROSSE, OF LEIPZIG-VOLKMARSDORF, GERMANY.

MACHINE FOR CUTTING THE EDGES OF BOOKS.

SPECIFICATION forming part of Letters Patent No. 741,002, dated October 6, 1903.

Original application filed February 21, 1899, Serial No. 706,393. Divided and this application filed July 16, 1900. Serial No. 23,793. (No model.)

*To all whom it may concern:*

Be it known that I, EDUARD GROSSE, a subject of the King of Saxony, residing at Leipzig-Volkmarsdorf, in the Kingdom of Saxony and German Empire, have invented certain new and useful Improvements in Machines for Cutting the Edges of Books, (for which I have applied for a patent in Germany, No. 105,339, dated August 12, 1898,) of which the following is a specification, being a divisional part of the application, Serial No. 706,393, filed February 21, 1899.

This invention relates to a rotary machine for cutting the edges of books provided with mechanism for feeding the books and a device for holding the latter under pressure while being cut.

Figure 1:
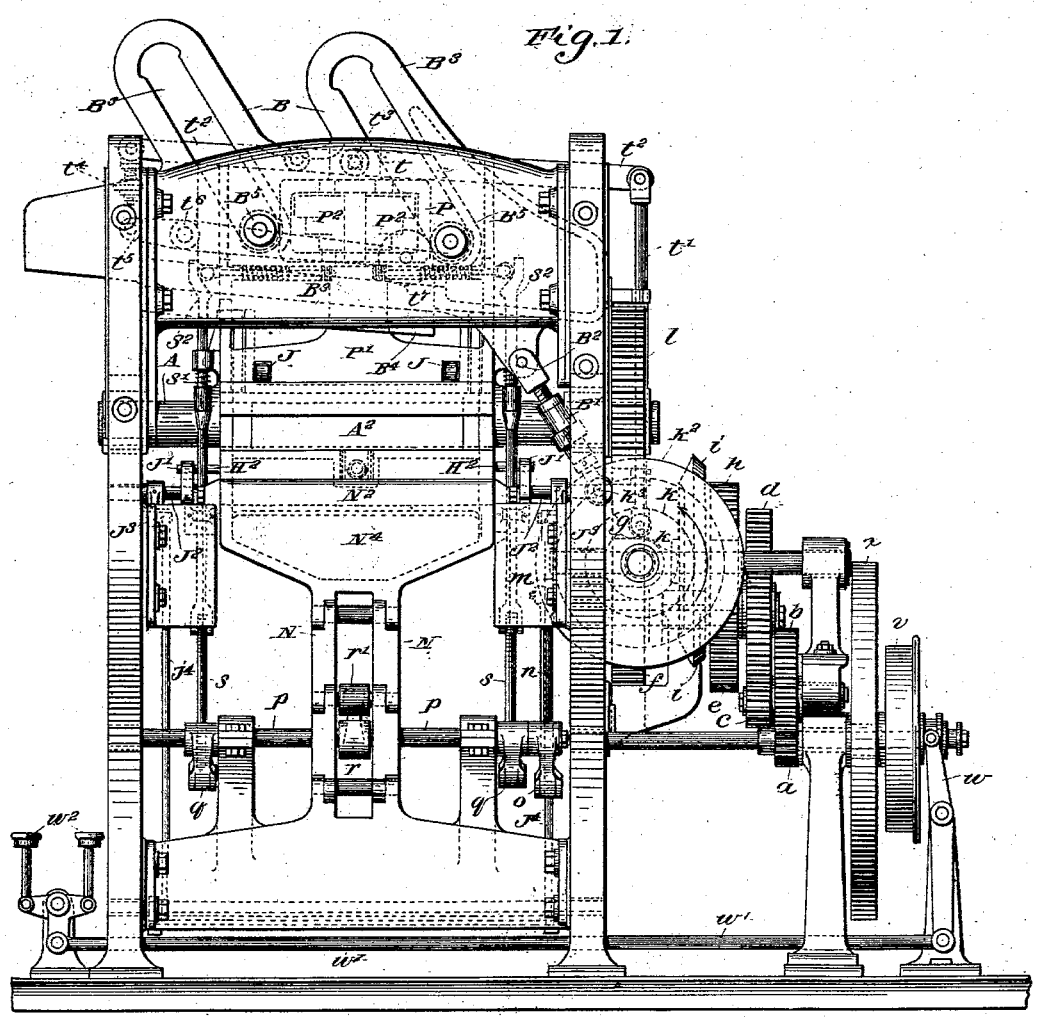
Figure 2:
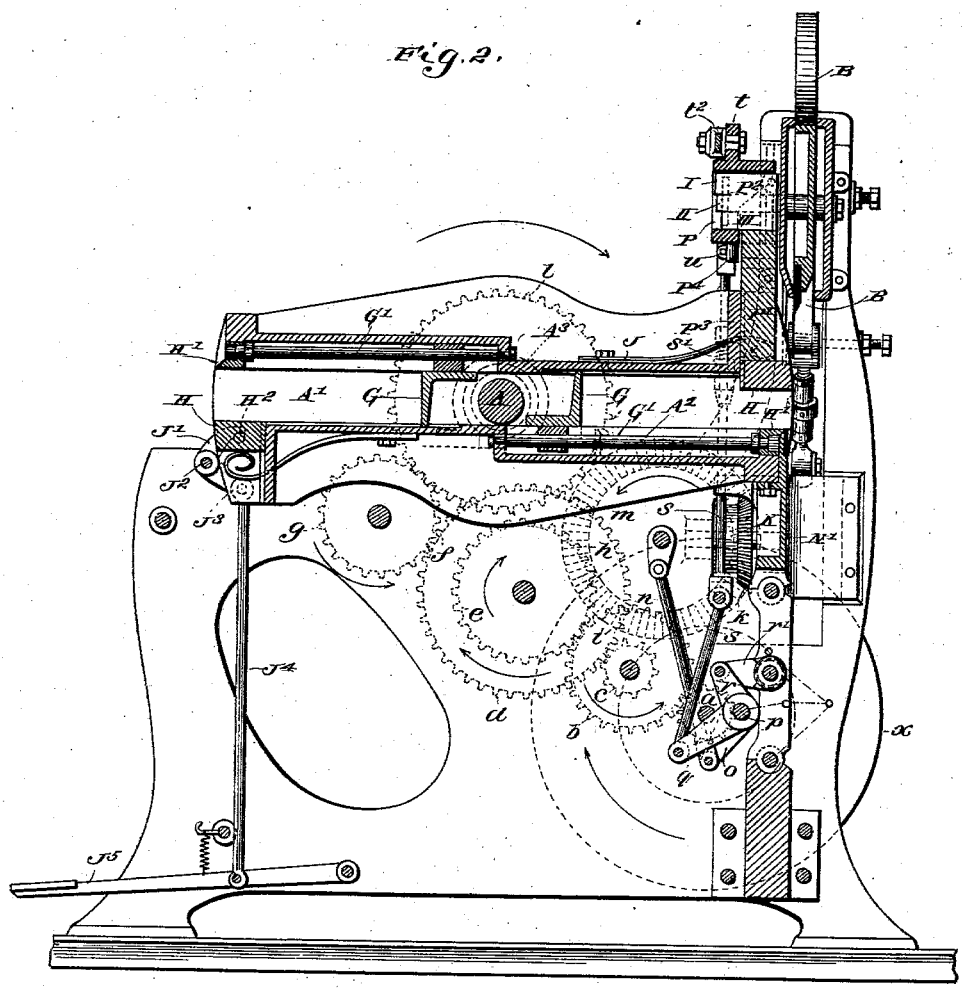

In the accompanying drawings, Figure 1 is a front elevation of the machine. Fig. 2 is a transverse section of the same. Fig. 3 is a front view of the pressing mechanism, on a larger scale. Fig. 4 is a transverse section of the same. Figs. 5 and 6 represent detail plans, partly in section, on the line 1 2, Fig. 4, showing different positions of the parts. Fig. 7 is a front elevation showing the combination of the coloring device with the cutting device. Fig. 8 is a transverse section of the same. Fig. 9 is a diagrammatic elevation of the gearing shown in Figs. 1 and 2, pitch-circles being indicated in dotted lines and real lines in full.

The rotary feeding device consists of a center shaft or hub A and of two hollow receivers A' and $A^2$, situated opposite to each other, which rotate intermittently through one hundred and eighty degrees in the direction of the arrow shown in Fig. 2. During the rest of the receivers—*i. e.*, after each half a rotation—a book is fed into the receiver A' opposite to the receiver $A^2$ and the cutting mechanism, and the book in the receiver $A^2$ is cut by the knife of the cutting mechanism, as hereinafter described. When the edge of the book in the receiver $A^2$ has been cut, the rotary feeding device makes half a revolution in the direction of the arrow, and the book the edge of which has been cut is thus carried to the place where the receiver A' was situated before, and the second book is carried to the place where the receiver $A^2$ was before and where it is then cut.

The machine is first driven by a pulley $v$, which is disengaged and engaged through a friction-coupling by means of a lever $w$, connecting-rod $w'$, and treadle $w^2$. (See Fig. 1.) A fly-wheel $x$ is situated at the side of the pulley $v$. On the shaft of the clutch-pulley $v$ is a pinion $a$, engaging with a spur-wheel $b$, on the shaft of which is keyed a pinion $c$, gearing with the spur-wheel $d$. Segment spur-wheels $e$ and $f$ are fixed on the same shaft as the spur-wheel $d$, the wheel $e$ engaging with a spur-wheel $h$ and the wheel $f$ with a spur-wheel $g$. The wheels $e$ and $f$ being provided with teeth only on one-half of their peripheries, as shown in the diagrammatic elevation, Fig. 9, rotate the spur-wheels $h$ and $g$, respectively, only during one-half of their revolutions, the rotation being then discontinued, so that the wheels $h$ and $g$ and the mechanism operated thereby come to rest. The arrangement is so designed that the half of the wheel $e$ which has teeth commences to engage with the wheel $h$ at the moment at which the teeth of the wheel $f$ cease to engage with the wheel $g$. Therefore the segment-wheels $e$ and $f$ engage with their respective spur-wheels alternately and the motion and rest of the mechanism operated by them alternately in a corresponding manner.

The rotary feeding device is operated by means of the wheel $g$, which is half as large as the driving-wheel $f$ and drives a large spur-wheel $l$, situated on the shaft A of the rotary feeding device and which is twice as large as the spur-wheel $g$. Consequently the spur-wheel $l$ makes only half a revolution, while the spur-wheel $g$ makes a whole revolution, during the engagement with the toothed segment of the driving spur-wheel $f$, so that in each complete revolution of the wheel $f$ the wheel $l$ and the feeding device rotating with it make half a revolution during one half of the revolution of the wheel $f$ and are at rest during the other half, when the toothed segment of the wheel $f$ is not in engagement. In the same manner the other wheel $e$, provided with teeth on only one-half of its circumference, effects the alternating operation of the pressing and cutting mechanisms. The segment-wheel $e$ commences to rotate the spur-wheel $h$, which is equal in circumference with the wheel $e$, at the same moment when the rotary feeding device comes to rest.

Keyed on the shaft of the wheel $h$ is a bevel-wheel $i$, which operates a bevel-wheel $k$. The latter carries a crank-disk $k^2$, which effects the ascent and decent of the beam B, carrying a knife $B^4$. (See Figs. 1, 2, 7, and 8.) The bevel-wheel $k$ is only half as large as the bevel-wheel $i$, which latter makes only half a revolution during the engagement of the wheel $h$ with the toothed segment of the wheel $e$ and in a corresponding period to that of the wheel $k$, so that the crank-disk $k^2$ makes a whole revolution, drawing the knife $B^4$ down and pushing it up again during half a revolution of the wheel $i$, and then rests while the toothed segment of the wheel $e$ is not in gear.

The foregoing gives a general view of the invention. The following describes the details shown in Figs. 3 to 8: The rotary feeding device consists of a central shaft or hub A and two hollow receivers A' and $A^2$, situated on opposite sides of the shaft, with which holding and pressing devices are combined. Each receiver is box-shaped. To insure the correct insertion of the books, each receiver is provided with a sliding angle-piece G, Fig. 2, against which the back of the book is placed. The position of the sliding angle-piece G is regulated, as in known paper-cutting machines, by a screw G', which engages with a screw-thread in the projecting angle-piece G and moves the latter forward or backward in the receiver, according to the rotation of the screw.

The holding device consists of an abutment H' and a movable press-beam H, pressed against the books by flat springs J, and is fixed on the receiver, so that it can be carried through the machine. The pressing mechanism P supplies through the beam H the additional pressure upon the book which is necessary in cutting.

To allow of the removal of the book at A' and the insertion of another book, a gripper J' is provided, pivoted at $J^2$ in the stationary frame, connected at $J^3$ to a draw-bar $J^4$, which is connected with a treadle-lever $J^5$. When the latter is depressed, the before-described gripping mechanism occupies its lowest position, as shown in Figs. 1 and 2, the gripper J' reaching over a projection $H^2$ on the pressing-beam H and pulling the latter downward, so that the book can be removed and another inserted. When the treadle $J^5$ is allowed to ascend, the gripper J moves upward and away from the projection $H^2$ and the pressing-beam H is released and presses the book under the action of the flat spring J. By half a revolution the receiver A', containing the book pressed thereinto, is carried to the position of the receiver $A^2$, where the cutting mechanism and a second pressing mechanism are located. The cutting mechanism is operated, as before mentioned, by the spur-wheel $h$ and the bevel $i$, Figs. 1 and 2, which drives the bevel-wheel $k$, on which is situated a crank-disk $k^2$, Figs. 5 and 7. The crank-disk $k^2$ is connected by a pin $k^3$ with a draw-bar B', Figs. 1 and 7, which is attached at $B^2$ to a beam B, carrying a knife $B^4$. The knife-beam B slides up and down in the frame and is guided by roller-pins $B^5$, Fig. 1, in oblique slots $B^3$ in the knife-beam B. The rotation of the crank-disk $k^2$ transmits by the connecting-rod B' reciprocating motion, which causes the alternating ascent and descent of the knife-beam B and the knife $B^4$. In consequence of the oblique slots $B^3$ the movement of the knife $B^4$ is diagonal to insure a better cut. The knife $B^4$ is arranged obliquely to the cutting-table and cuts against a lower knife $N^2$, situated on the cutting-support N', Fig. 4.

During the cutting operation it is necessary not only to apply additional pressure on the books by the pressing device P, but also to give a support to the receiver $A^2$, which is below the cutting device, to enable it to resist the pressure of the knife acting from above. The mechanism for this purpose is as follows, (see Figs. 3 and 4:) A crank $m$, Figs. 2 and 4, on the shaft of the bevel-wheel $i$ effects the operation of the pressing mechanism P and the cutting-support N'. The crank $m$ is connected by a connecting-rod $n$ with a crank $o$, which is fixed to the shaft $p$. As the crank $o$ is longer than the diameter of the circle described by the crank $m$, the rotary motion of the latter is transmitted to the crank $o$ as an oscillating motion. The shaft $p$ partakes of this motion, and the cranks $q$ and $r$, fixed on the shaft $p$, oscillate also up and down in approximately a semicircle. The crank $r$ operates the cutting-support N' and the crank $q$ the pressing mechanism P. The cutting-support consists of the toggle-lever N and the beam N', guided in the frame and carrying a lower knife $N^2$, of steel. The toggle-lever N is connected by a link $r'$ with the crank $r$. When the crank $r$, operated by the crank $m$, oscillates up and down, this oscillating motion is transmitted to the toggle-lever N, which is alternately bent and straightened. The guided support-beam N' by this movement is slid up and down, descending when the toggle-lever N is bent and ascending when the latter is straightened. During its ascent it gives a free passage to the rotary feeding device, and when in its upper position it serves as a rest for the edge of the rotary feeding device in which the book is clamped.

The extra pressure for holding the book while cutting is effected by the mechanism P, which consists of a pressing-beam P', Figs. 3 and 4, guided up and down in the frame and raised and lowered by the rods $s$, $s'$, and $s^2$ to a variable extent, governed by the pivoted pressing-blocks $P^2$, Figs. 3, 4, 5, and 6, which are adjustable to press automatically at all levels or thicknesses of books and controlled by the lever mechanism $t$ to $t^7$, which effects the automatic adjustment in pressing.

Figs. 3 to 6 show the pressing mechanism separately in elevation, vertical section, side view, and details. The ascent and descent of the pressing mechanism are effected by the oscillating crank $q$, connected to rods $s$, which pass through guides $P^3$ on the pressing-beam $P'$ and carry the latter with them by means of projections $s^3$ during their ascent. Simultaneously the beveled edges $s^2$ of the rods $s$ (see Fig. 3) push inward the spring-pressed elastic racks $u$, which engage with the pinions $P^4$, and as the latter are fixed to the pressing-block $P^2$ these receive a turning motion and occupy a position which allows of the passage of the pressing-beam $P'$ during its ascent.

The pressing-blocks $P^2$ are pivoted in a frame $t$, situated behind the pressing-beam $P'$, so that the latter can travel up and down in front of the frame $t$ when the pressing-blocks $P^2$ are turned out of the way. The frame $t$ is moved up and down by lever mechanism $t'$ to $t^7$—say, for example, to the extent of three centimeters. This up-and-down movement is effected by the eccentric or cam $K$, Figs. 1 and 2, which is fixed to the bevel-wheel $k$. A connecting-rod $t'$ runs by means of a roller on the eccentric $K$. The connecting-rod $t'$ is connected to the lever $t^2$, Figs. 1 and 3. The frame $t$ is suspended from the lever $t^2$ at $t^3$. An adjustable fulcrum-rod $t^4$ is joined to the lever $t^2$. To the rod $t^4$ is joined a lever $t^5$, fulcrumed at $t^6$ and carrying a counterbalance-weight $t^7$, which effects the pressing by lever mechanism.

The pressing movement effected by the parts $t'$ to $t^7$ is only equivalent to a space of three centimeters; but the books to be inserted into the rotary feeding device may be more—say nine centimeters thick, so that a rise and fall of the pressing mechanism equal to nine centimeters is required. To equalize these differences of thickness—i. e., to obtain the required additional space of six centimeters in this case—the two blocks $P^2$ are inserted as filling-pieces between the upper part of the frame $t$ and the pressing-beam $P'$.

The pressing-blocks $P^2$ are approximately semicylindrical, as indicated in the view thereof in Figs. 5 and 6, being on one side semicircular and on the other side almost straight, with a pin in the center to serve as a pivot. Fig. 3 shows the pressing-blocks with the frame $t$, in rear elevation, and Fig. 4 the frame in section and blocks in side view. Figs. 5 and 6 show the pressing-blocks $P^2$ and the upper face of the pressing-beam $P'$, with its projections $P^5$, in plan. The ends or pivots of the pressing-blocks $P^2$ turn in bearings on the frame $t$ and occupy at one time positions as shown in plan in Fig. 5 and at another time positions as shown in plan in Fig. 6. Each pressing-block has three steps, each step being three centimeters high—that is, exactly as high as the ascent and descent of the frame $t$. The steps therefore fill exactly the space required to be filled for the pressing of books less than six centimeters thick. When the steps I of the blocks $P^2$ rest on the projections $p^5$ of the pressing-beam $P'$, books can be pressed of from six to nine centimeters thickness. When the following steps II rest on the projections $P^5$, books from three to six centimeters thick may be pressed. When the steps III rest on the projection $P^5$, books less than three centimeters thick can be pressed.

Figs. 3 and 4 show the pressing-blocks $P^2$ in the position in which they press books up to three centimeters thick. The plan, Fig. 5, shows them in a position in which the steps I rest on the projection $P^5$, so that books from six to nine centimeters thick may be pressed. Another plan, Fig. 6, shows the pressing-blocks entirely turned back from the pressing-beam—that is, in a position which allows of the complete ascent of the pressing-beam $P'$. This movement of the pressing-blocks $P^2$ is obtained by the spring-pressed racks $u$, Figs. 1 and 3, which engage in pinions $P^4$. The beveled ends $s^2$ of the racks $u$, operated by the connecting-rod $s$, turn the blocks $P^2$ back behind the pressing-beam $P'$, and they are returned again across the pressing-beam $P'$ by means of the spiral springs $u'$, Figs. 1 and 3. When the rods $s$, and with them the pressing-beam $P'$, are pushed upward, their beveled ends $s^2$ push the racks $u$, provided with rollers, inward and turn the pressing-blocks $P^2$ behind the pressing-beam $P'$ into the position shown in plan in Fig. 6. The pressing-beam $P'$, so that said beam will pass the blocks $P^2$, is moved upward by the connecting-rod $s$ sufficiently high to allow of the free passage of the rotary feeding device.

In order to allow the blocks $P^2$ to be turned back at the correct time, the connecting-rod $s$ runs empty in its guides $P^3$ on the pressing-beam $P'$ until the blocks $P^2$ are turned back by the racks $u$ behind the pressing-beam $P'$. Then the projections $s^x$ of the connecting-rod $s$ engage under the guides $P^3$ and raise the pressing-beam. The springs $s'$ are provided to draw the pressing-beam $P'$ onto the pressing-beam H of the rotary feeding device at the descent of the connecting-rod $s$. When the connecting-rods $s$ have arrived in their lowest position and the racks $u$ are freed from side pressure at $s^2$, the springs $u'$ press them outward and the steps of the blocks $P^2$ are turned over the projections $P^5$ of the pressing-beam $P'$ as far as the thickness of the inserted book allows. For instance, if a book of two centimeters thickness has been inserted then all three steps pass over the projections $P^5$, the space between the upper part $t$ and the pressing-beam $P'$ has been filled, and the automatic pressing by the lever mechanism $t'$ to $t^7$ commences. If a book of five centimeters thickness has been inserted, only two steps pass over the projections $P^5$ of the pressing-beam. If a book of seven or eight centimeters thickness has been inserted, only the uppermost step passes. In this manner books of any thickness are pressed by the blocks P⁴ and the mechanism relating thereto in combination with the lever and eccentric mechanism $t$ to $t^7$.

In connection with my machine for cutting the edges of books I employ a coloring device for which no claim is herein made and which is arranged on the rear side of the receiver A', where the cutting mechanism is situated. This coloring device consists of a color-receptacle D, feed-rollers $D^2 D^3$, and printing-roller D', mounted in a movable frame $D^4$, jointed to rods $B^3$, connected by pivot $B^9$ to a slide $B^{10}$, traveling in vertical guides $B^6$ and resting by roller $B^7$ on top of the knife-beam B. As the coloring device descends by gravity with the cutting movement of the knife guide-rollers $D^5$, Fig. 7, on ends of the printing-roll D' are pressed outward by springs $D^8$ and pass around the guiding projection $D^6$ in the direction indicated by the arrow in Fig. 8. Passing from I to II the printing-roll is carried by gravity beneath the projection $D^6$, and then by the ascent of the knife-beam B it is carried upward at III, so as to apply the color to the cut edge of the book.

The following is what I claim as new and desire to secure by Letters Patent:

1. In a machine for cutting the edges of books, the combination of the two receivers A' A², mounted on a common rotatable shaft A; gearing imparting a half-revolution thereto successively in one and the same direction, whereby the respective positions of the receivers are transposed at each movement; a guided cutting device B operating in conjunction with the successive receivers; automatic mechanism actuating the said cutting device while the receivers are at rest; and continuously-moving driving mechanism acting on the rotating mechanism and the cutter-actuating mechanism successively, substantially as described.

2. In a machine for cutting the edges of books, the combination of a feeding device intermittently rotated, in one and the same direction, having two book-receivers A' and A² moved from the receiving place to the cutting place and vice versa, at each semirotation; a cutting device B acting in conjunction with the respective receivers in the second position; a holding device 4 4' on each receiver to retain the book therein; a pressing device P located behind the cutting device serving to clamp the successive books while being cut; and a movable support N N' serving to sustain the successive receivers while the book is being cut, substantially as described.

3. In a machine for cutting the edges of books, the combination of a rotatable feeding device having two book-receptacles; mutilated gearing imparting intermittent periodic rotation to said feeding device through a semicircle at each movement; a guided cutting device, to which the books are successively presented by the intermittent rotation of the receivers; and actuating mechanism for the cutting device, operating alternately with the rotary motion of the feeding device, so that the cutter operates while the feeders are at rest and vice versa.

4. In a machine for cutting the edges of books, the combination of two receivers A' and A² for the reception successively of two books; a rotatable shaft A on which receivers are mounted; mutilated gearing imparting to said receivers periodic rotation in one direction through a semicircle at each movement; a holding device H, H', J, for retaining the books in the successive receivers; a guided cutting device B to which the books are successively carried; and a gripping device J', J⁴, J⁵, for releasing the books successively as they are carried to the first position, after cutting, substantially as described.

5. In a machine for cutting the edges of books, the combination of two receivers A' A² for the reception successively of two books; a common rotatable shaft A on which said receivers are mounted; mutilated gearing imparting to said receivers periodic rotation through a semicircle at each movement, whereby the books are carried successively from the place of insertion to the place of cutting; a retaining device H, H', J, for holding the books in the receivers; a guided cutting device B acting in conjunction with the receivers successively in their second position; and a pressing device P having an automatic adjusting device P² for clamping books of various thickness while being cut, substantially as described.

6. In a machine for cutting the edges of books, the combination of a feeding device having two receivers A' and A² and a holding device H, H' J, for securing books therein; means for imparting periodic rotation to said feeding device intermittently in one direction through a semicircle at each movement, so as to carry successive books from the place of insertion to the place of cutting; a guided cutting device B acting in conjunction with the receivers A' and A² successively while in the second position; an automatically-adjustable pressing device P P² clamping the successive books while being cut; a movable support N' N, sustaining the successive book-receivers in the cutting operation; and a gripper J' for releasing the books when returned to the original position after cutting, substantially as described.

In testimony whereof I have hereunto set my hand in the presence of two witnesses.

EDUARD GROSSE.

Witnesses:
RUDOLPH FRICKE,
B. H. WARNER, Jr.